No. 889,128. PATENTED MAY 26, 1908.
W. A. HENDRYX.
APPARATUS FOR TREATING ORES.
APPLICATION FILED NOV. 26, 1906.

2 SHEETS—SHEET 1.

No. 889,128. PATENTED MAY 26, 1908.
W. A. HENDRYX.
APPARATUS FOR TREATING ORES.
APPLICATION FILED NOV. 26, 1906.

3 SHEETS—SHEET 2.

UNITED STATES PATENT OFFICE.

WILBUR ALSON HENDRYX, OF DENVER, COLORADO.

APPARATUS FOR TREATING ORES.

No. 889,128.  Specification of Letters Patent.  Patented May 26, 1908.

Application filed November 26, 1906. Serial No. 345,152.

*To all whom it may concern:*

Be it known that I, WILBUR ALSON HENDRYX, a citizen of the United States, residing at Hotel Metropole, in the city of Denver, in the county of Denver and State of Colorado, have invented new and useful Improvements in Apparatus for Treating Ores, of which the following is a specification.

In my prior patent No. 785,214, granted March 21, 1905, I have described and claimed an apparatus for treating ores comprising a tank for containing ore-pulp, electrodes therein, and aerating means constructed to lift portions of the pulp and distribute the same in contact with the atmosphere.

The present invention relates to an improvement upon this construction as applied to certain uses, whereby the electrodes are rendered more accessible, the electric current is automatically interrupted upon cessation of the agitation or aeration of the pulp, and other important advantages are secured.

For a full understanding of my invention reference is made to the accompanying drawings showing a form of tank particularly adapted for the separation of precious metals from their cyanid solutions.

Figure 1:
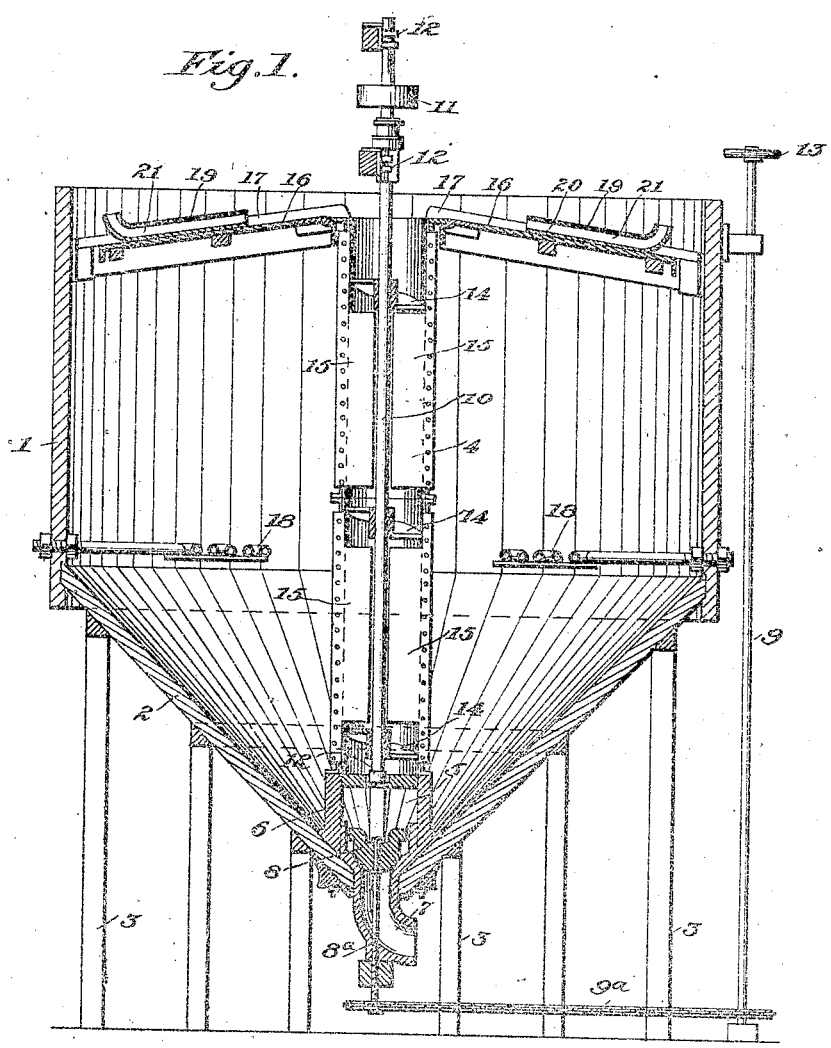
Figure 2:
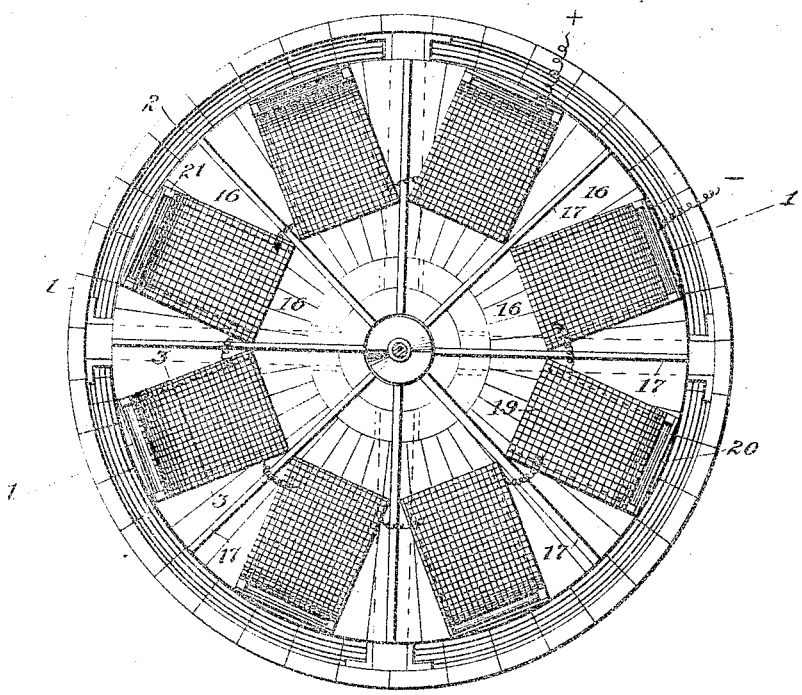
Figure 3:
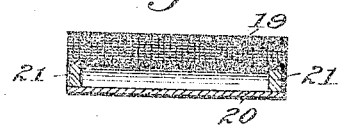

In said drawings—Figure 1 is a central vertical section of the preferred form of tank; Fig. 2 is a plan view of the same; and Fig. 3 is a vertical section on an enlarged scale through the electrodes on line 3—3 of Fig. 2.

Referring to the drawings, 1 represents a tank, herein indicated as cylindrical and provided with a conical bottom 2, 3, 3, being the supporting timbers or the like. Centrally disposed in the tank is a tubular casing 4, open at both ends and communicating with the tank through apertures 5 in a cage-like support 6. The tank is provided with a bottom discharge aperture 7 controlled by a valve 8 which may be operated from the top of the tank by a rod 9 provided with a hand-wheel 13, and connected through a sprocket chain 9ª with the downwardly extended stem 8ª of the valve 8. A shaft 10 is axially disposed in the casing 4, mounted in upper and lower bearings 12, and is rotatable by a pulley 11. This shaft carries helical blades 14, similar in construction to those illustrated in the patent above referred to. Stationary baffles 15 are provided, extending radially inward from the casing for the purpose of preventing the whirling of the upwardly moving column of pulp and insuring its delivery in a continuous stream to all portions of the spreader 16.

This spreader comprises a conical annular apron encircling the upper portion of the tubular casing 4, suitably supported in the tank, and extending outwardly and downwardly nearly to the inner wall of the tank and slightly below its top. Radial ribs 17 in any desired number extend slightly above the upper surface of the spreader, dividing it into a corresponding number of shallow channels.

18 is a steam or other coil for controlling the temperature of the contents of the tank.

In the construction shown the electrodes are mounted upon the spreader, and comprise anodes 19 and cathodes 20, the anodes consisting of sheets, or preferably of screens of a suitable metal as iron, and the cathodes of sheets of amalgamated copper. The current connections are made in series or parallel in any desired manner; as illustrated the several groups of electrodes are connected in series, the cathode of each group being in metallic connection with the anode of one of the adjacent groups. The cathodes preferably curve upwardly near their outer ends as shown particularly in Fig. 3, and the electrodes of each group are spaced by parallel insulating bars 21 adjacent their edges; these bars extend rearwardly into contact with the radial ribs 17, and in conjunction therewith direct the entire stream of pulp over and between the electrodes. The upward curvature of the outer ends of the cathodes is chiefly for the purpose of retarding the outflow of the pulp to a sufficient extent to insure that the anodes shall be immersed so long as the pulp is flowing.

The operation of the apparatus as applied to the treatment of ores containing the precious metals by means of cyanid solutions is as follows: The ore and solution are charged into the tank in the form of pulp and circulated therein by rotation of the shaft 10 in such direction as to lift the pulp and discharge it upon the spreader 16 in contact with the atmosphere, the stream of pulp passing over and between the several groups of electrodes 19, 20. The precious metals are thereby deposited upon the cathodes, and when they have accumulated thereon in sufficient quantity are readily recovered by lifting the anodes and scraping or brushing the cathodes in the usual manner. The cathodes may then be reamalgamated, the anodes replaced, and the operation resumed, the tank being discharged and refilled from time to time. Whenever for any reason circulation is stopped the pulp ceases to flow upon the spreader, and the small quantity of liquid lying upon each cathode rapidly drains therefrom, either beneath the spacing bars 21 or through small apertures provided for the purpose; the electric circuit is thereby automatically interrupted and the cathodes rendered available for inspection or for the recovery of the metal.

The apparatus may be variously modified within the scope of the claims. It will be understood that the tank and parts of the apparatus will be constructed of material adapted for use in the particular solutions to be treated.

I claim:

1. Apparatus for treating ores, comprising a tank, means for continuously aerating the contents of said tank by lifting portions and moving them in a thin sheet or film in contact with the atmosphere, and electrodes disposed in the path of said lifted portions.

2. Apparatus for treating ores, comprising a tank, a conical spreader for the ore-pulp, a passage-way leading from the lower portion of said tank and discharging upon said spreader, means for circulating pulp through said passage-way, and electrodes above said spreader.

3. Apparatus for treating ores, comprising a tank, a conical spreader for the ore-pulp, a central passage-way communicating with the lower portion of said tank and discharging upon said spreader, means for circulating pulp through said passage-way, and electrodes above said spreader.

4. Apparatus for treating ores, comprising a tank, a spreader for the ore-pulp, a passage-way leading from the lower portion of said tank and discharging upon said spreader, means for circulating pulp through said passage-way, and electrodes upon said spreader and substantially parallel thereto.

5. Apparatus for treating ores, comprising a tank, a conical spreader for the ore-pulp, a central passage-way communicating with the lower portion of said tank and discharging upon said spreader, means for circulating pulp through said passage-way, and electrodes upon said spreader and substantially parallel thereto.

6. Apparatus for treating ores, comprising a tank, a spreader for the ore-pulp, a passage-way leading from the lower portion of said tank and discharging upon said spreader, means for circulating pulp through said passage-way, electrodes above said spreader, a central discharge valve for said tank, and means below said valve for actuating the same.

7. Apparatus for treating ores, comprising a tank, means for continuously aerating the contents of said tank by lifting portions and distributing them in contact with the atmosphere, electrodes disposed in the path of said lifted portions, a central discharge valve for said tank, and means below said valve for actuating the same.

In testimony whereof I affix my signature in presence of two witnesses.

WILBUR ALSON HENDRYX.

Witnesses:
 THEODORA WELLS,
 CHAS. R. DAVIES.